(12) United States Patent
Ma (10) Patent No.: US 10,146,720 B2
(45) Date of Patent: Dec. 4, 2018

(54) FLEXIBLE CONFIGURATION SERVER SYSTEM

(71) Applicant: Quanta Computer Inc., Taoyuan (TW)

(72) Inventor: Yao-Feng Ma, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 210 days.

(21) Appl. No.: 15/145,110

(22) Filed: May 3, 2016

(65) Prior Publication Data

US 2017/0322900 A1 Nov. 9, 2017

(51) Int. Cl.
*G06F 13/40* (2006.01)
*H01R 12/00* (2006.01)
*G06F 13/00* (2006.01)

(52) U.S. Cl.
CPC .......... *G06F 13/4068* (2013.01); *G06F 13/00* (2013.01); *G06F 13/4022* (2013.01); *H01R 9/09* (2013.01)

(58) Field of Classification Search
CPC ........ G06F 13/4022; G06F 13/00; H01R 9/09
See application file for complete search history.

(56) References Cited

U.S. PATENT DOCUMENTS 6,381,149 B1 * 4/2002 Megason ............. H05K 7/1405
361/756
7,794,233 B1 * 9/2010 Millard .................. G06F 1/185
439/65
2003/0224630 A1 * 12/2003 Dean ...................... G06F 1/184
439/74
2011/0083129 A1 * 4/2011 Masaki ...................... G06F 8/65
717/175
2011/0305294 A1 * 12/2011 Moriya ............. H04W 52/0216
375/295
2013/0060987 A1 * 3/2013 Bolen ..................... G06F 13/00
710/316

(Continued)

FOREIGN PATENT DOCUMENTS

CN 101432706 A 5/2009
TW 20160208 A 1/2016
WO 2015/163865 A1 10/2015

OTHER PUBLICATIONS

TW third Office Action for Application No. 105130118, dated Jul. 25, 2017, w/ third Office Action Summary.

(Continued)

*Primary Examiner* — Farley Abad
*Assistant Examiner* — Getente A Yimer
(74) *Attorney, Agent, or Firm* — Nixon Peabody LLP; Eduardo J. Quiñones (57) ABSTRACT

A flexible server configuration system includes a connector array including a plurality of slots and a first jumper board configured to removably engage with the connector array by connecting to a first set of consecutive slots from the plurality of slots. The first jumper board is configured to disengage and reengage from the connector array to connect with a different set of consecutive slots from the plurality of slots. The system further includes a first set of at least one peripheral device, each connected to one of the plurality of slots, and a first node including at least one first node processor. The first node is connected to two of the plurality of slots.

11 Claims, 7 Drawing Sheets

(56) References Cited

U.S. PATENT DOCUMENTS

2015/0143018 A1\* 5/2015 Kim .................... G06F 13/4022
710/316

OTHER PUBLICATIONS

Taiwanese Office Action for Application No. 105130118, dated Jan. 4, 2017, w/ First Action Summary.
Taiwanese Second Office Action for Application No. 105130118, dated Apr. 13, 2017, w/ Second Office Action Summary.

\* cited by examiner

610
CONNECTING A FIRST SET OF AT LEAST ONE PERIPHERAL DEVICE TO A CONNECTOR ARRAY COMPRISING A PLURALITY OF SLOTS

620
CONNECTING A FIRST NODE TO TWO OF THE PLURALITY OF SLOTS, WHEREIN THE FIRST NODE COMPRISES AT LEAST ONE FIRST NODE PROCESSOR

630
ENGAGING A FIRST JUMPER BOARD TO THE CONNECTOR ARRAY BY CONNECTING TO A FIRST SET OF CONSECUTIVE SLOTS FROM THE PLURALITY OF SLOTS

640
DISENGAGING THE FIRST JUMPER BOARD FROM THE CONNECTOR ARRAY

650
REENGAGING THE FIRST JUMPER BOARD TO THE CONNECTOR ARRAY TO CONNECT TO A DIFFERENT SET OF CONSECUTIVE SLOTS FROM THE PLURALITY OF SLOTS

(12) United States Patent
US 10,146,720 B2

FLEXIBLE CONFIGURATION SERVER SYSTEM

TECHNICAL FIELD

Embodiments of the system and method generally related to computer server systems. More specifically, embodiments of the system and method generally relate to computer server systems with a flexible configuration.

BACKGROUND

A computer server system may be required to operate in a variety of different applications. The arrangement of the system components, also called the system architecture, can be flexible through the use of cables and/or switchboards. However, the use of cables and switch boards causes several problems. The use of cables to connect various system components is inefficient and expensive due to the cost of cables and engineering their installation. The use of cables also requires routing the cables within the system, taking up space that otherwise could be used for components. Cables also negatively impact the air flow within the system, resulting in less effective cooling of the system components and more energy required to properly cool the system. Service of the system is also impaired having to deal with a large number of cables that must be disconnected and reconnected in order to change the system configuration.

SUMMARY

This disclosure provides a system and method of a flexible configuration for a server system. A connector array engages a first switch board and optionally a second switch board. At least one central processing unit (CPU) and at least one peripheral device connect to the switch boards and the connector array. Through the arrangement of the switch boards on the connector array, a number of configurations of CPUs and GPUs and other components can be achieved, without rearranging cable. By disengaging and reengaging at least one of the switch boards in the connector array, additional configurations of components can be achieved, allowing a user to quickly and easily reconfigure the server system by only replacing at least one switch board in the connector array. By treating the switch boards as jumpers, a number of configurations can quickly and easily be accomplished, without the use of cabling and a plurality of connectors. A variety of other components may also be connected through the switch board, including but not limited to network cards and redundant array of inexpensive disks (RAIDs).

In some aspects, a flexible server configuration system includes a connector array including a plurality of slots and a first jumper board configured to removably engage with the connector array by connecting to a first set of consecutive slots from the plurality of slots. The first jumper board is configured to disengage and reengage from the connector array to connect with a different set of consecutive slots from the plurality of slots. The system further includes a first set of at least one peripheral device, each connected to one of the plurality of slots, and a first node including at least one first node processor. The first node is connected to two of the plurality of slots.

In some aspects, a method for a flexible server configuration includes connecting a first set of at least one peripheral device to a connector array including a plurality of slots. The method connects a first node to two of the plurality of slots, where the first node includes at least one first node processor. The method engages a first jumper board to the connector array by connecting to a first set of consecutive slots from the plurality of slots. The method disengages the first jumper board from the connector array, and reengages the first jumper board to the connector array to connect to a different set of consecutive slots from the plurality of slots.

It is to be understood that both the foregoing general description and the following detailed disclosure are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Embodiments of the disclosure provide a system and method of flexible configuration of a server system. At least one central processing unit (CPU) and at least one peripheral device, such as a network interface controller (NIC) and/or graphic processing unit (GPU), is connected via a switch board and a connector array. Through the arrangement of the switch board on the connector array, a number of configurations of CPUs and peripheral devices may be achieved. By placing a first switch board and a second switch board into the connector array, a configuration of connected components can be achieved, without the use of cabling. By removing and replacing at least one of the switch boards in the connector array, additional configuration of components can be achieved, allowing a user to quickly and easily reconfigure the server system by only replacing at least one switch board in the connector array. By treating the switch boards as jumpers, a number of configurations can quickly and easily be accomplished, without the use of cabling and a plurality of connectors. A variety of other components may also be connected through the switch board, including but not limited to network cards, GPUs, and/or redundant array of inexpensive disks (RAIDs).

Figure 1:
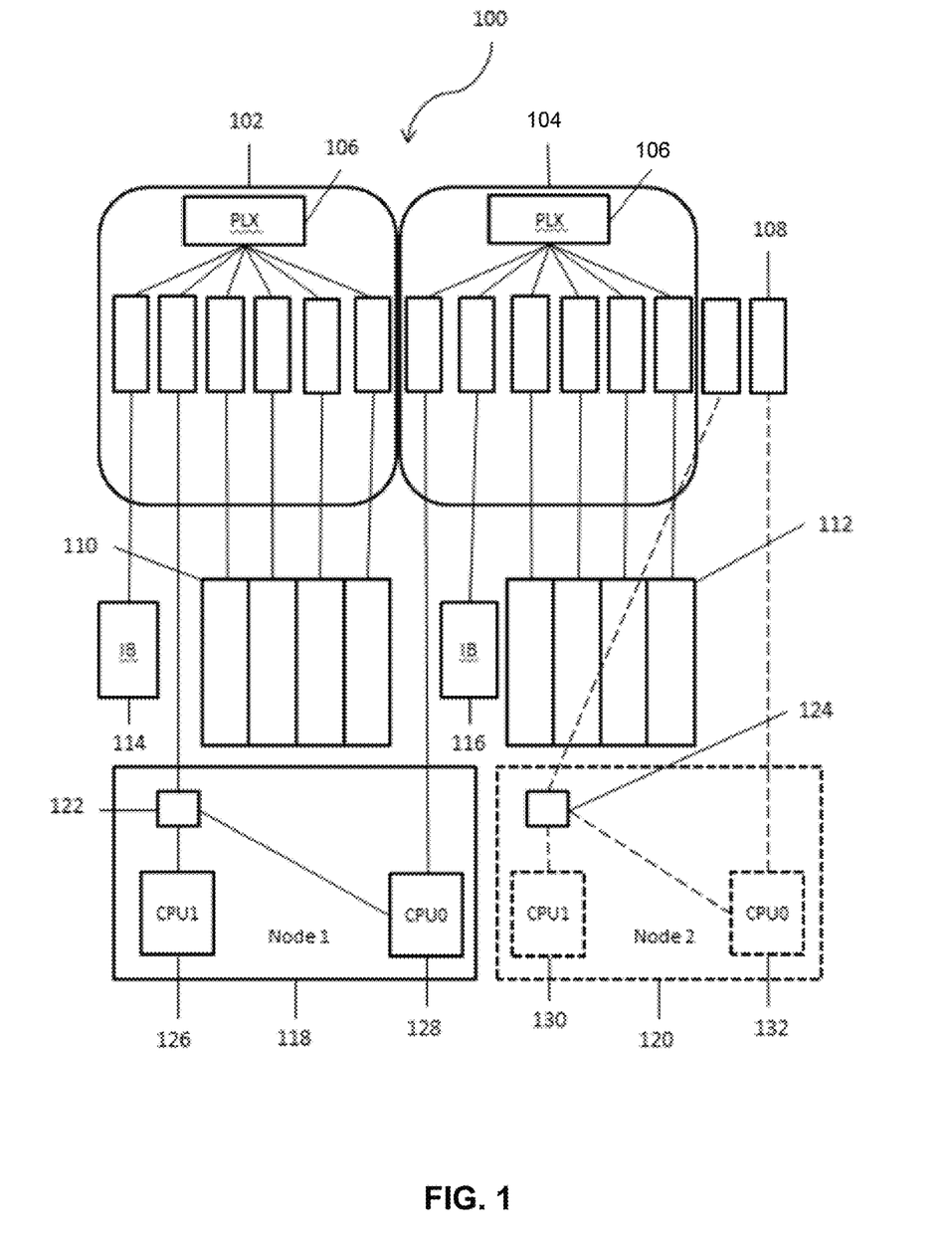
FIG. 1 illustrates a block diagram of an example flexible server configuration system with a one-node, two-CPU configuration.

FIG. 1 illustrates a block diagram of an example flexible server configuration system 100 with a one-node, two-CPU configuration. A first jumper board 102 (e.g., a six-port PCIe (Peripheral Component Interconnect Express) jumper board) is engaged in the first six board-to-board connectors (slots) of a connector array 108 (e.g., a PCIe x16 connector array). A second jumper board 104 is engaged adjacent to the first jumper board 102 in the connector array 108. Note that each of the first jumper board 102 and the second jumper board 104 can be disengaged from the connector array 108 and reengaged with any of the slots of the connector array 108. Each of the jumper boards 102, 104 also include a multiplexer/switch 106, as is known to those of skill in the art.

The first jumper board 102 is connected to a first network interface card (NIC) 114 via the first of the six slots connecting the first jumper board 102 to the connector array 108. The second of the six slots is connected to a first multiplexer 122 of Node One 118. Node One 118 includes two CPUs 126, 128. CPU1 126 of Node One 118 is connected to the first jumper board 102 via the first multiplexer 122. In this configuration, the first multiplexer 122 prevents the CPU0 128 from connecting to the first jumper board 102, by selecting CPU1 instead. The remaining four slots of the connector array 108 connected to the first jumper board 102 are in communication with a first GPU array 110.

The second jumper board 104 is engaged adjacent to the first jumper board 102 and engaged in the connector array 108 and is connected to the seventh through twelfth slots of the connector array 108 (from left to right). The second jumper board 104 includes a multiplexer 106. The second jumper board 104 is connected to CPU0 128 via the seventh slot of the connector array 108. A second NIC 116 connects to the second jumper board 104 via the eighth slot of the connector array 108. A second GPU array 112 connects to the second jumper board 104 via the ninth through twelfth slots of the connector array 108.

Node Two 120 is not connected to either the first jumper board 102 or the second jumper board 104 and is therefore isolated. In some aspects, Node Two 120 is not included in the system 100. The second multiplexer 124 is connected to the thirteenth slot of the connector array 108. CPUs 130, 132 are connected to the second multiplexer 124 in the Node Two 120. The CPU0 132 is also connected to the fourteenth slot of the connector array 108.

Placing the first jumper board 102 into the first six slots of the connector array 108 (from left to right) and the second jumper board 104 in the next six slots of the connector array 108 provides the configuration of one node 118 with two CPUs 126, 128 available to the system 100. Because of the placement of the first and second jumper boards 102, 104, the Node Two 120 is isolated and not accessible in this configuration.

Figure 2:
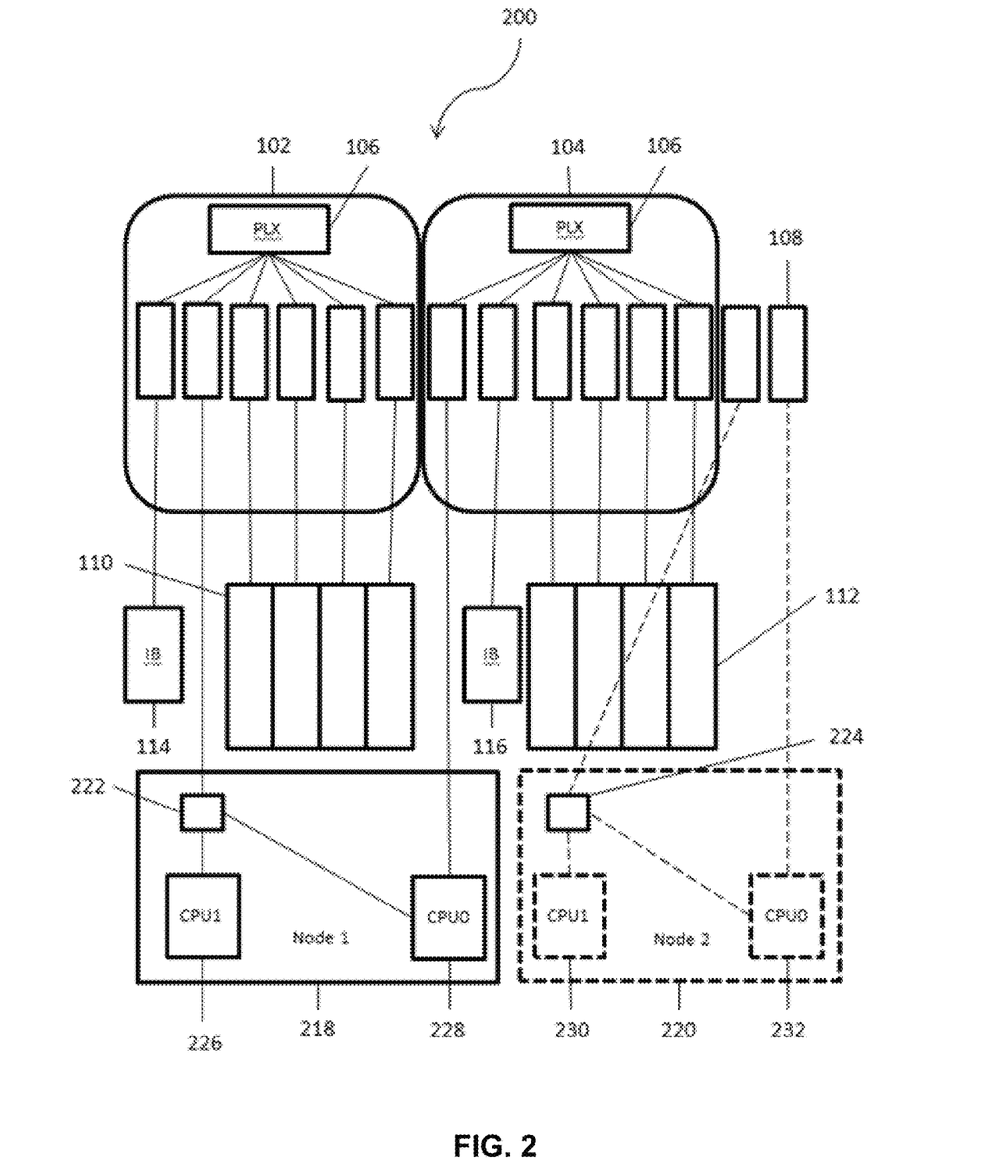
FIG. 2 illustrates a block diagram of an example flexible server configuration system with a one-node, one-CPU configuration.

FIG. 2 illustrates a block diagram of an example flexible server configuration system 200 with a one-node, one-CPU configuration. A first jumper board 102 is engaged in the first six board-to-board connectors (slots) of a connector array 108 (e.g., a PCIe x16 connector array). A second jumper board 104 is engaged adjacent to the first jumper board 102 in the connector array 108. Note that each of the first jumper board 102 and the second jumper board 104 can be disengaged from the connector array 108 and reengaged with any of the slots of the connector array 108. Each of the jumper boards 102, 104 also include a multiplexer/switch 106, as is known to those of skill in the art.

The first jumper board 102 is connected to a first network interface card (NIC) 114 via the first of the six slots connecting the first jumper board 102 to the connector array 108. The second of the six slots is connected to a first multiplexer 122 of Node One 218. Node One 218 includes two CPU slots 226, 228, but only CPU0 slot 228 has an active and/or installed CPU. CPU1 slot 226 of Node One 218 is connected to the first jumper board 102 via the first multiplexer 222. In this configuration, the first multiplexer 222 prevents the CPU1 slot 226 from connecting to the first jumper board 102, by selecting CPU0 228 slot instead. The remaining four slots of the connector array 108 connected to the first jumper board 102 are in communication with a first GPU array 110.

The second jumper board 104 is engaged adjacent to the first jumper board 102 and engaged in the connector array 108 and is connected to the seventh through twelfth slots of the connector array 108 (from left to right). The second jumper board 104 includes a multiplexer 106. The second jumper board 104 is connected to CPU0 slot 228 via the seventh slot of the connector array 108. A second NIC 116 connects to the second jumper board 104 via the eighth slot of the connector array 108. A second GPU array 112 connects to the second jumper board 104 via the ninth through twelfth slots of the connector array 108.

Node Two 220 is not connected to either the first jumper board 102 or the second jumper board 104 and is therefore isolated. In some aspects, Node Two 220 is not included in the system 200. The second multiplexer 224 is connected to the thirteenth slot of the connector array 108. CPUs slots 230, 232 are connected to the second multiplexer 224 in the Node Two 220. The CPU0 slot 232 is also connected to the fourteenth slot of the connector array 108.

Placing the first jumper board 102 into the first six slots of the connector array 108 (from left to right) and the second jumper board 104 in the next six slots of the connector array 108 provides the configuration of one node 218 with one CPU installed at CPU0 slot 228 available to the system 200. Because of the placement of the first and second jumper boards 102, 104, the Node Two 220 is isolated and not accessible in this configuration.

Figure 3:
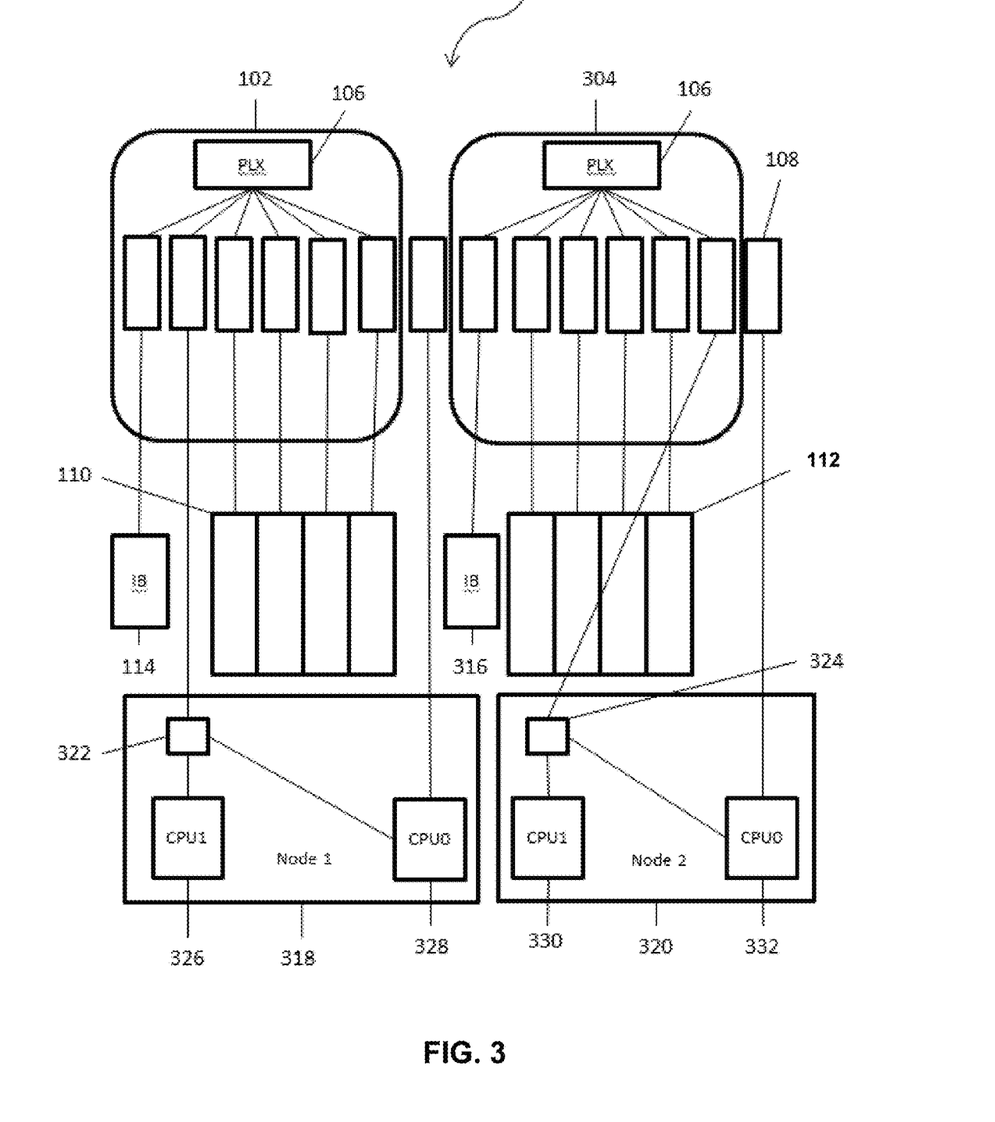
FIG. 3 illustrates a block diagram of an example flexible server configuration system with a two-node, two-CPU configuration.

FIG. 3 illustrates a block diagram of an example flexible server configuration system 300 with a two-node, two-CPU configuration. A first jumper board 102 is engaged in the first six board-to-board slots of the connector array 108. A single slot of the connector array 108 is skipped and the second jumper board 304 is engaged in the next six slots (eighth to thirteenth) of the connector array 108. Each of the jumper boards 102, 304 also include a multiplexer/switch 106, as is known to those of skill in the art.

The first jumper board 102 is connected to a first NIC 114 via the first of the six slots connecting the first jumper board 102 to the connector array 108. The second of the six slots engaged by the first jumper board 102 is connected to the first multiplexer 322 of the Node One 318. Node One 318 includes two CPU slots 326, 328, but only CPU0 slot 328 has an active and/or installed CPU. In this configuration, the first multiplexer 322 prevents the CPU1 slot 326 from connecting to the first jumper board 102, by selecting CPU0 slot 328 instead. The remaining four slots of the connector array 108 connected to the first jumper board 102 are in communication with the first GPU array 110.

The second jumper board 304 engages the connector array 108 beginning at the eighth slot of the connector array 108, from left to right. The second jumper board 304 includes a multiplexer 106. CPU0 slot 328 is connected to the seventh slot of the connector array 108, but this slot of the connector array 108 is inactive. A second NIC 316 connects to the second jumper board 304 via the eighth slot of the connector array 108, which is the first slot of the second jumper board 304. The second GPU array 112 connects to the second jumper board 304 via the ninth through twelfth slots of the connector array 108.

Node Two 320 is connected only to the second jumper board 304. The second multiplexer 324 is connected to the thirteenth slot of the connector array 108 and the second jumper board 104. Node Two 320 includes two CPU slots 330, 332, but only CPU0 slot 332 has an active and/or installed CPU. The second multiplexer 324 blocks the CPU1 slot 330 while allowing the CPU0 slot 332 to connect to the second jumper board 304 via the thirteenth slot of the connector array 108. The CPU0 slot 332 is also connected to the fourteenth slot of the connector array 108, but this slot of the connector array 108 is inactive.

Placing the first jumper board 102 into the first six slots of the connector array 108, skipping a slot, and placing the second jumper board 304 into the next six slots provides the configuration of two nodes 318, 320 with one CPU each (i.e., two CPUs total) available to the system 300.

Figure 4:
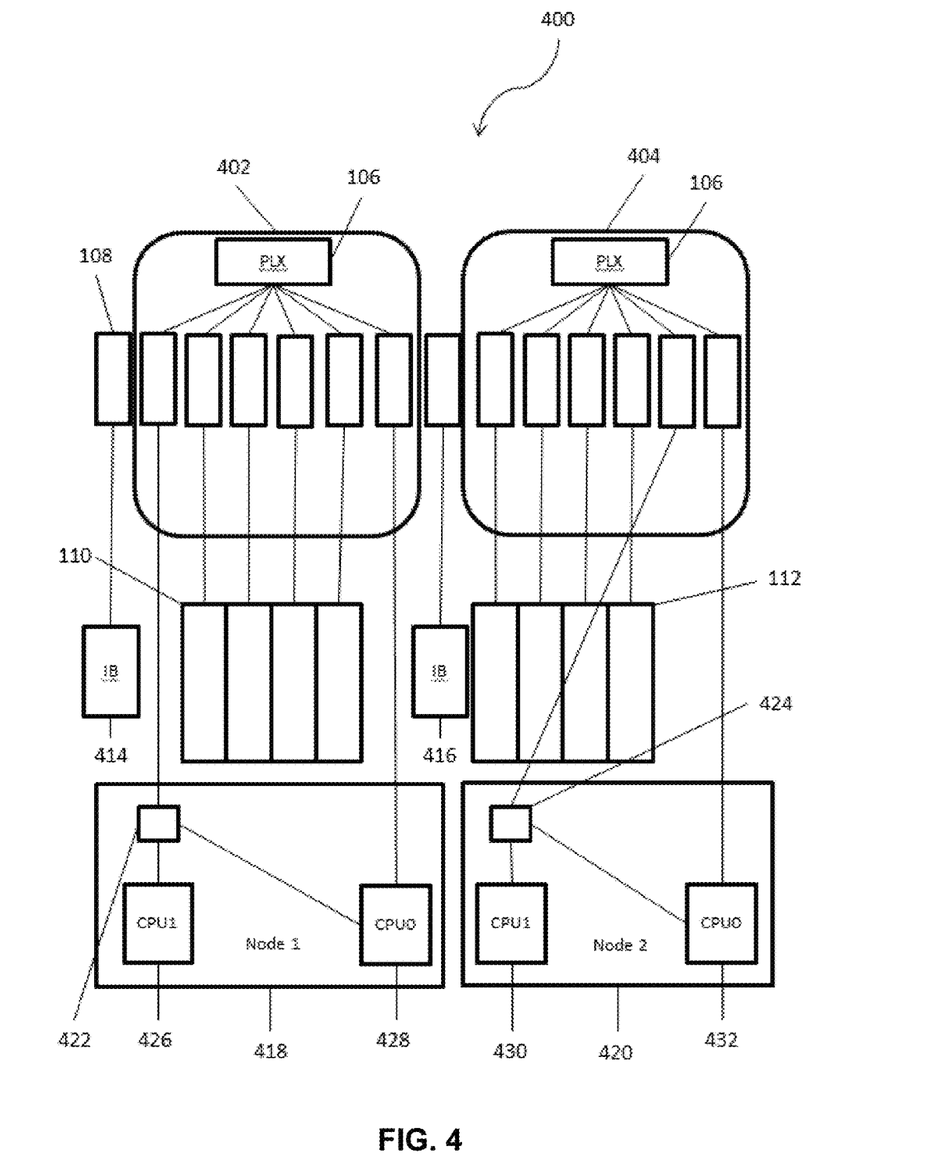
FIG. 4 illustrates a block diagram of an example flexible server configuration system with a two-node, four-CPU configuration.

FIG. 4 illustrates a block diagram of an example flexible server configuration system 400 with a two-node, four-CPU configuration. A first six-port jumper board 402 is engaged in the second to seventh board-to-board slots of the connector array 108, a single slot of the connector array 108 is skipped and a second jumper board 404 is engaged in the next six slots of the connector array 108. Each of the jumper boards 402, 404 includes a multiplexer/switch 106, as is known to those of skill in the art.

The first jumper board 402 is connected to the first NIC 414 via the first of the six slots connecting the first jumper board to the connector array 108. The second of six slots engaged by the first jumper board 402 is connected to the first multiplexer 422 of the Node One 418. In this configuration, CPU1 slot 426 and CPU0 slot 428 of Node One 418 is connected to the first multiplexer 422. Node One 418 includes two CPUs installed in CPU slots 426, 428. The first multiplexer 422 blocks CPU0 slot 428 while allowing the CPU1 slot 426 to connect to the first jumper board 402 via the second slot of the connector array 108. CPU0 slot 248 connects to the first jumper board 401 via the seventh slot of the connector array 108. The second to sixth slots of the connector array 108 connected to the first jumper board 402 are connected to the first GPU array 110. A second NIC 416 is connected to the eighth slot of the connector array 108.

The second jumper board 404 engages the connector array 108 beginning at the ninth slot of the connector array 108, from left to right. The second jumper board 404 includes a multiplexer 106. In this configuration, CPU1 slot 430 and CPU0 slot 432 of Node Two 420 is connected to the second multiplexer 424. Node Two 420 includes two CPUs installed in two CPU slots 430, 432. The second multiplexer 424 blocks CPU0 slot 432 while allowing the CPU1 slot 430 to connect to the second jumper board 404 via the thirteenth slot of the connector array 108. CPU0 slot 432 is connected to the second jumper board 404 via the fourteenth slot of the connector array 108.

In this embodiment, placing the first jumper board 402 beginning at the second slot of the connector array 108 from left to right, skipping a slot, and then placing the second jumper board 404 into the next six slots provides the configuration of two nodes with two CPUs (i.e., four CPUs total) each available to the system 400.

Figure 5:
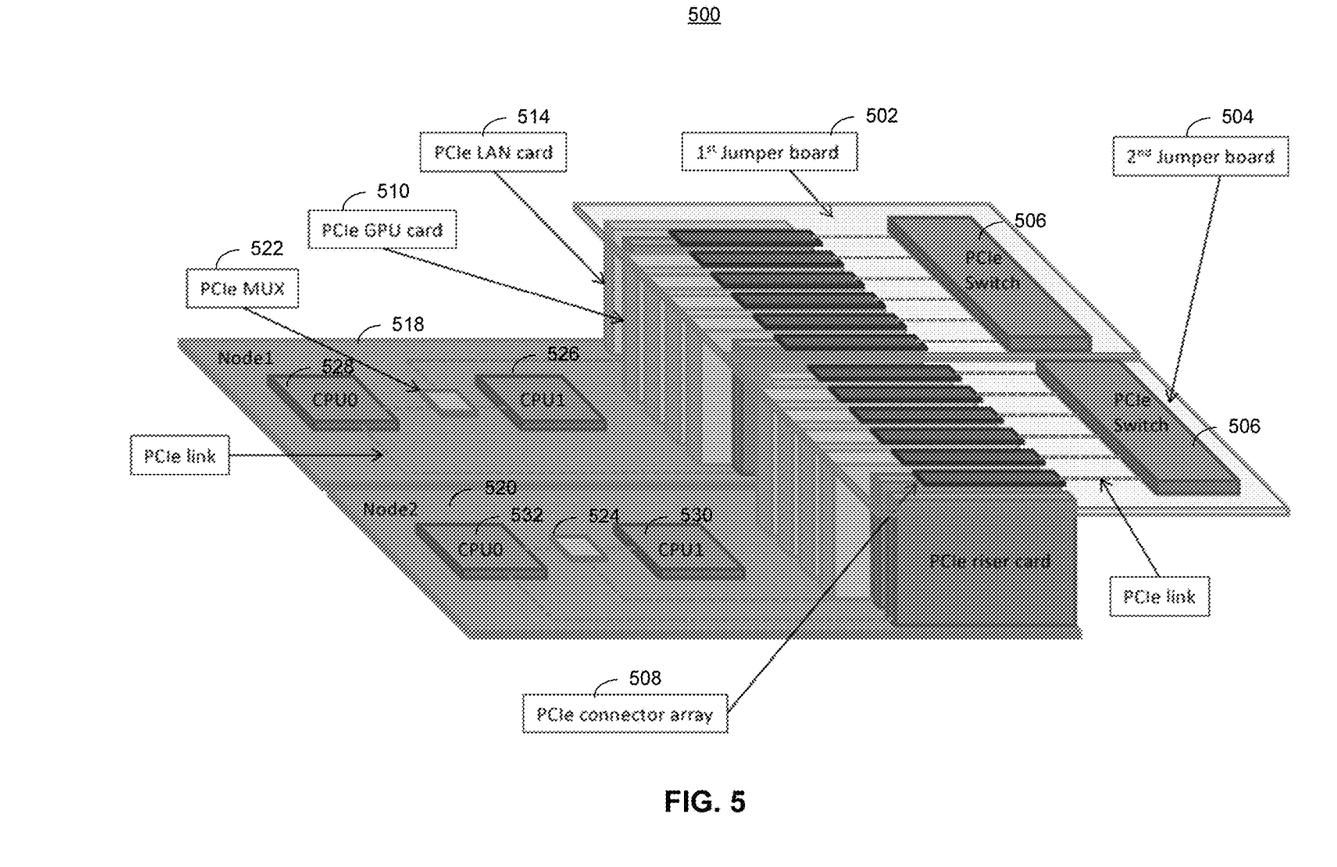
FIG. 5 illustrates a perspective view of an example flexible server configuration system.

FIG. 5 illustrates a perspective view of an example flexible server configuration system 500. The system 500 can be adapted into any of the configurations shown in FIGS. 1-4.

A first six-port jumper board 502 is engaged in a first set of slots of the connector array 508 and a second jumper board 504 is engaged in a second set of slots of the connector array 108. Each of the jumper boards 502, 504 includes a multiplexer/switch 506, as is known to those of skill in the art. Each of the jumper boards 502, 504 can be disengaged from the connector array 508 and reengaged to different slots on the connector array 508 to change the system 500 into a different configuration.

Node1 518 includes one or more CPUs 526, 528 connected to a first multiplexer 522. Node1 518 includes a second set of GPUs 510 and a first NIC 514.

Node2 520 includes one or more CPUs 530, 532 connected to a second multiplexer 524. Node1 518 can include a second set of GPUs and a second NIC.

Figure 6:
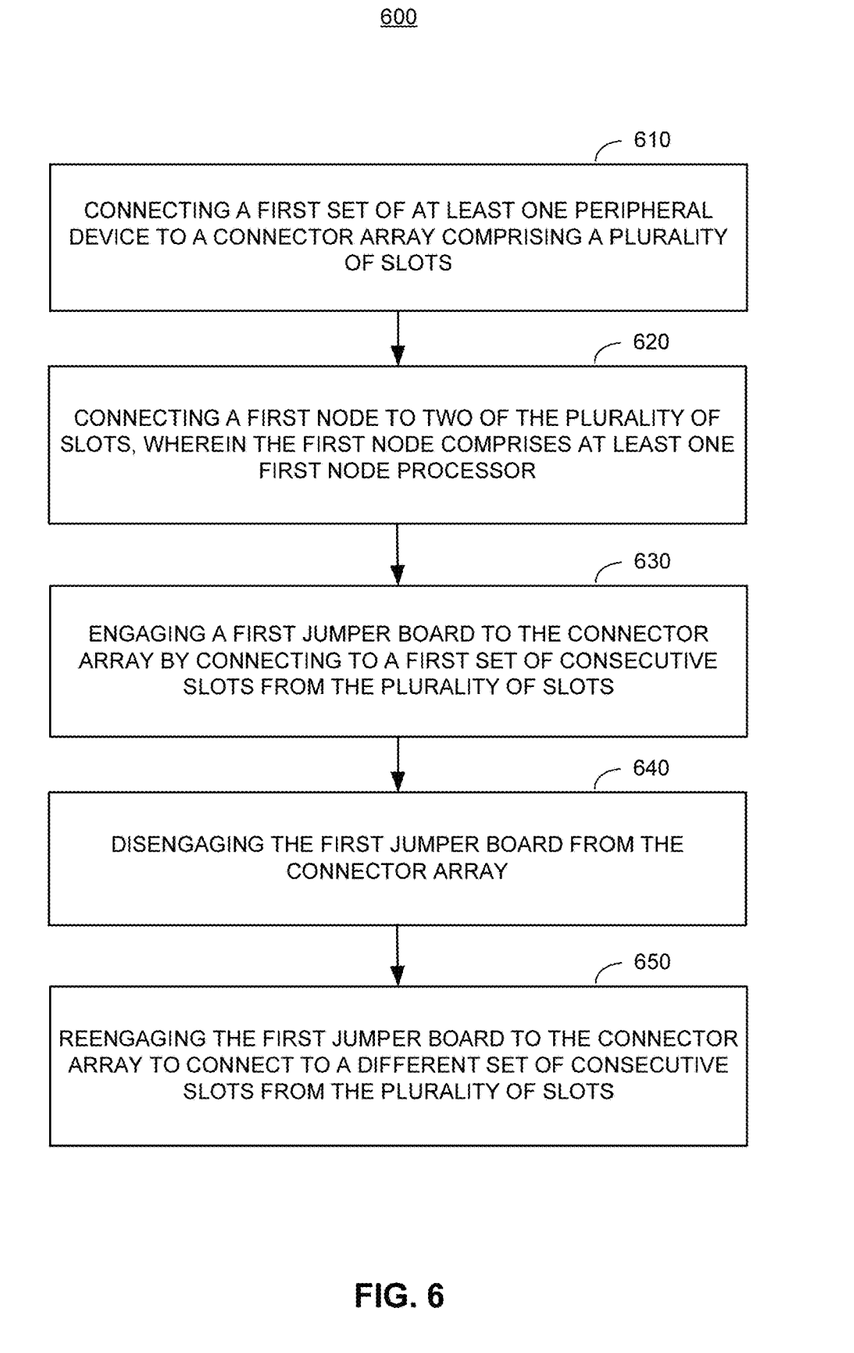
FIG. 6 illustrates an example methodology for a flexible server configuration.

FIG. 6 illustrates an example methodology 600 for a flexible server configuration. At step 610 the method connects a first set of at least one peripheral device to a connector array comprising a plurality of slots.

At step 620 the method connects a first node to two of the plurality of slots, wherein the first node comprises at least one first node processor.

At step 630, the method engages a first jumper board to the connector array by connecting to a first set of consecutive slots from the plurality of slots.

At step 640, the method disengages the first jumper board from the connector array.

At step 650, the method reengages the first jumper board to the connector array to connect to a different set of consecutive slots from the plurality of slots.

Figure 7:
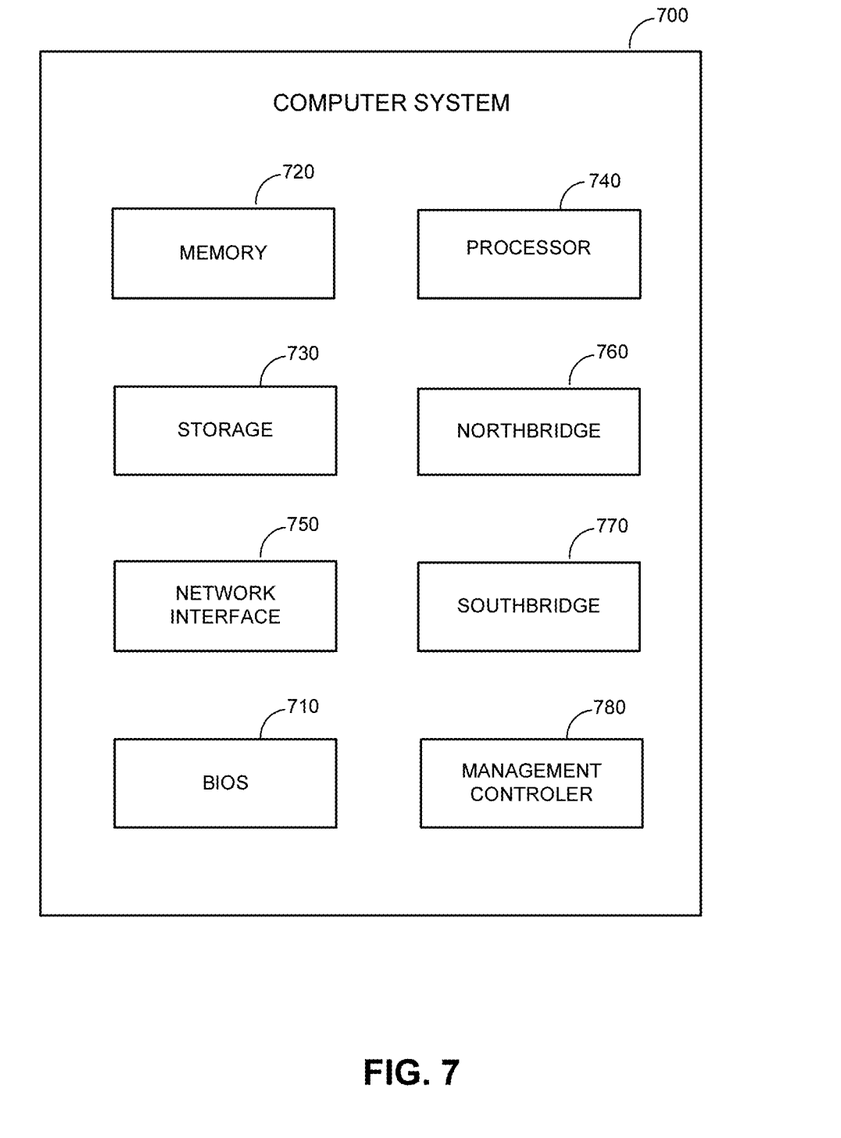
FIG. 7 illustrates a block diagram of an example computer system.

FIG. 7 illustrates a block diagram of an example computer system 700. A computer system of the subject disclosure can be any of various central processing unit (CPU) architectures such as x86, Acorn RISC Machine (ARM), Microprocessor without Interlocked Pipeline Stages (MIPS), etc. The example computer system 700 has an x86 CPU architecture. The computer system 700 includes a processor 740, a network interface 750, a management controller 780, a memory 720, a storage 730, a BIOS 710, a northbridge 760, and a southbridge 760.

The computer system 700 is, for example, a server (e.g., a server in a server rack of a data center) or a personal computer. The processor (e.g., central processing unit (CPU)) 740 is a chip on a motherboard that retrieves and executes programming instructions stored in the memory 720. The processor 740 is a single CPU with a single processing core, a single CPU with multiple processing cores, or multiple CPUs. One or more buses (not shown) transmit instructions and application data between various computer components such as the processor 740, memory 720, storage 730, and networking interface 750.

The memory 720 includes any physical device used to temporarily or permanently store data or programs, such as various forms of random-access memory (RAM). The storage 730 includes any physical device for non-volatile data storage such as a HDD or a flash drive. The storage 730 can have a greater capacity than the memory 720 and can be more economical per unit of storage, but can also have slower transfer rates.

The BIOS 710 includes a Basic Input/Output System or its successors or equivalents, such as an Extensible Firmware Interface (EFI) or Unified Extensible Firmware Interface (UEFI). The BIOS 710 includes a BIOS chip located on a motherboard of the computer system 700 storing a BIOS software program. The BIOS 710 stores firmware executed when the computer system is first powered on along with a set of configurations specified for the BIOS 710. The BIOS firmware and BIOS configurations are stored in a non-volatile memory (e.g., NVRAM) or a ROM such as flash memory. Flash memory is a non-volatile computer storage medium that can be electronically erased and reprogrammed.

The BIOS 710 is loaded and executed as a sequence program each time the computer system 700 is started. The BIOS 710 recognizes, initializes, and tests hardware present in a given computing system based on the set of configurations. The BIOS 710 performs self-test, such as a Power-on-Self-Test (POST), on the computer system 700. This self-test tests functionality of various hardware components such as hard disk drives, optical reading devices, cooling devices, memory modules, expansion cards and the like. The BIOS addresses and allocates an area in the memory 720 in to store an operating system. The BIOS 710 then gives control of the computer system to the OS.

The BIOS 710 of the computer system 700 includes a BIOS configuration that defines how the BIOS 710 controls various hardware components in the computer system 700. The BIOS configuration determines the order in which the various hardware components in the computer system 700 are started. The BIOS 710 provides an interface (e.g., BIOS setup utility) that allows a variety of different parameters to be set, which can be different from parameters in a BIOS default configuration. For example, a user (e.g., an administrator) can use the BIOS 710 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 780 is a specialized microcontroller embedded on the motherboard of the computer system. For example, the management controller 780 is a baseboard management controller (BMC). The management controller 780 manages the interface between system management software and platform hardware. Different types of sensors built into the computer system report to the management controller 780 on parameters such as temperature, cooling fan speeds, power status, operating system status, etc. The management controller 780 monitors the sensors and has the ability to send alerts to an administrator via the network interface 750 if any of the parameters do not stay within preset limits, indicating a potential failure of the system. The administrator can remotely communicate with the management controller 780 to take some corrective action such as resetting or power cycling the system to restore functionality.

The northbridge 760 is a chip on the motherboard that can be directly connected to the processor 740 or is integrated into the processor 740. In some instances, the northbridge 760 and the southbridge 760 is combined into a single die. The northbridge 760 and the southbridge 760, manage communications between the processor 740 and other parts of the motherboard. The northbridge 760 manages tasks that require higher performance than the southbridge 760. The northbridge 760 manages communications between the processor 740, the memory 720, and video controllers (not shown). In some instances, the northbridge 760 includes a video controller.

The southbridge 760 is a chip on the motherboard connected to the northbridge 760, but unlike the northbridge 760, need not be directly connected to the processor 740. The southbridge 760 manages input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 700. The southbridge 760 connects to or includes within the southbridge 760 the management controller 760, Direct Memory Access (DMAs) controllers, Programmable Interrupt Controllers (PICs), and a real-time clock. In some instances, the southbridge 760 directly connects to the processor 740, such as in the case where the northbridge 760 is integrated into the processor 740.

The networking interface 750 is any interface that supports wired or wireless Local Area Networks (LANs) or Wide Area Networks (WANs), such as Ethernet, Fibre Channel, Wi-Fi, Bluetooth, Firewire, the Internet, etc. For example, the networking interface 750 can include a network interface controller (NIC) for Ethernet. Ethernet has been the most widely used networking standard for connecting computers in both Local Area Networks (LANs) and Wide Area Networks (WANs). Ethernet defines a number of wiring and signaling standards for the physical layer (PHY), through means of network access at the Media Access Control (MAC)/Data Link Layer, and through a common addressing format. Ethernet enabled devices typically communicate by transmitting data packets, which comprise blocks of data that are individually sent and delivered.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor is a microprocessor, or in the alternative, any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and write information to, the storage medium. In the alternative, the storage medium is integral to the processor. The processor and the storage medium resides in an ASIC. The ASIC resides in a user terminal. In the alternative, the processor and the storage medium resides as discrete components in a user terminal.

In one or more exemplary designs, the functions described is implemented in hardware, software, firmware, or any combination thereof. If implemented in software, the functions are stored on or transmitted over as one or more instructions or code on a non-transitory computer-readable medium. Non-transitory computer-readable media includes both computer storage media and communication media including any medium that facilitates transfer of a computer program from one place to another. A storage media is any available media that can be accessed by a general purpose or special purpose computer. By way of example, and not limitation, such computer-readable media includes RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A flexible server configuration system comprising:
a connector array comprising a plurality of slots;
a first jumper board configured to removably engage with the connector array by connecting to a first set of consecutive slots from the plurality of slots, the first jumper board configured to disengage and reengage from the connector array to connect with a different set of consecutive slots from the plurality of slots;
a first set of at least one peripheral device, each connected to one of the plurality of slots;
a first node comprising a first processor slot having a first node processor, and a second processor slot having a second node processor, the first node connected to two of the plurality of slots; and
a second node comprising a third processor slot having a third node processor connected to a slot of the plurality of slots; a fourth processor slot and a second node multiplexer connected to the third processor slot and the fourth processor slot, the second node multiplexer configured to select at least one of the third processor slot or the fourth processor slot to connect to at least the slot of the plurality of slots.

2. The flexible server configuration system of claim 1, wherein the first node further comprises:
a first node multiplexer connected to the first processor slot and the second processor slot, a first node multiplexer configured to select one of the first processor slot or the second processor slot to connect to one of the plurality of slots.

3. The flexible server configuration system of claim 1, further comprising a second jumper board configured to removably engage with the connector array by connecting to a second set of consecutive slots from the plurality of slots, the second jumper board configured to disengage and reengage from the connector array to connect with a different set of consecutive slots from the plurality of slots.

4. The flexible server configuration system of claim 1, wherein the first set of at least one peripheral device comprises at least one graphics processing unit (GPU).

5. The flexible server configuration system of claim 1, wherein the first set of at least one peripheral device comprises at least one network interface controller (NIC).

6. The flexible server configuration system of claim 1, further comprising:
a first network interface controller (MC) connected to a first slot of the plurality of slots;
a plurality of graphics processing units (GPUs) each connected to a corresponding consecutive slot starting from a third slot of the plurality of slots,
wherein the first jumper board is connected to a second slot of the plurality of slots and another slot of the plurality of slots.

7. The flexible server configuration system of claim 1, wherein the connector array comprises fourteen slots.

8. The flexible server configuration system of claim 7, further comprising four graphics processing units (GPUs) respectively connected to a third, fourth, fifth, and six slot of the fourteen slots.

9. The flexible server configuration system of claim 7, wherein
the first processor slot is connected to a seventh slot of the fourteen slots;
and
a first node multiplexer connected to the first processor slot, the second processor slot, and a second slot of the fourteen slots.

10. A method for a flexible server configuration, comprising:
connecting a first set of at least one peripheral device to a connector array comprising a plurality of slots;
connecting a first node to two of the plurality of slots, wherein the first node comprises a first processor slot and a second processor slot, the first processor slot having a first node processor, the second processor slot having a second node processor;
connecting a second node to one of the plurality of slots, wherein the second node comprises a third node processor connected to a slot of the plurality of slots; a fourth processor slot and a second node multiplexer connected to the third processor slot and the fourth processor slot, the second node multiplexer configured to select at least one of the third processor slot or the fourth processor slot to connect to at least the slot of the plurality of slots
engaging a first jumper board to the connector array by connecting to a first set of consecutive slots from the plurality of slots;
disengaging the first jumper board from the connector array; and reengaging the first jumper board to the connector array to connect to a different set of consecutive slots from the plurality of slots.

11. The method of claim 10, further comprising:
engaging a second jumper board to the connector array by connecting to a second set of consecutive slots from the plurality of slots;
disengaging the second jumper board from the connector array; and
reengaging the second jumper board to the connector array to connect to a different set of consecutive slots from the plurality of slots.

* * * * *